Dec. 2, 1952 — C. E. LEHMANN — 2,619,999
CARRIER MOUNTED WORK CLAMPING AND RELEASING MECHANISM
Filed Sept. 27, 1949 — 3 Sheets-Sheet 1

INVENTOR.
Clifford E. Lehmann,
BY Parker, Prochnow & Horner,
Attorneys.

Dec. 2, 1952   C. E. LEHMANN   2,619,999
CARRIER MOUNTED WORK CLAMPING AND RELEASING MECHANISM
Filed Sept. 27, 1949   3 Sheets-Sheet 2

INVENTOR.
Clifford E. Lehmann,
BY
Parker, Brochman & Parmer,
Attorneys.

Dec. 2, 1952     C. E. LEHMANN     2,619,999
CARRIER MOUNTED WORK CLAMPING AND RELEASING MECHANISM
Filed Sept. 27, 1949     3 Sheets-Sheet 3
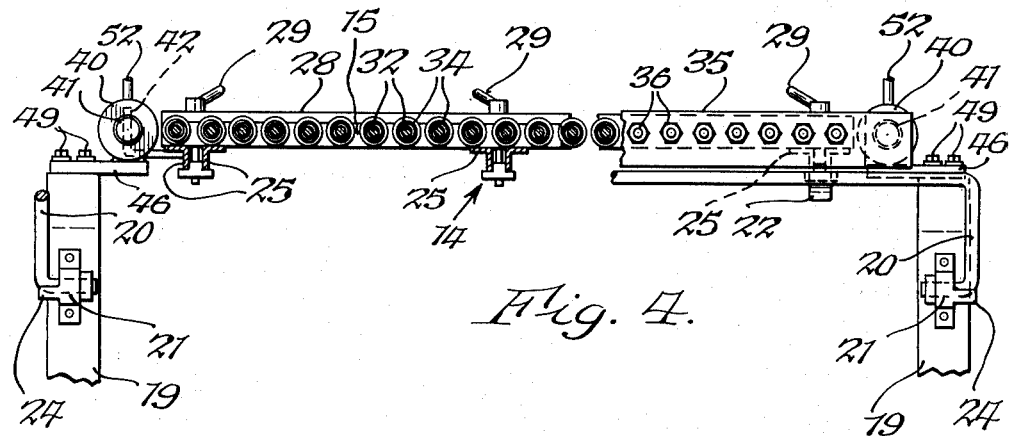
Fig. 4.
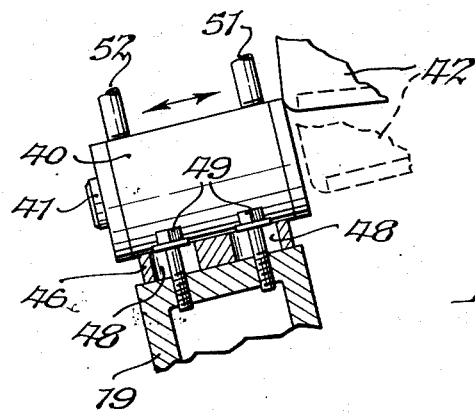
Fig. 5.
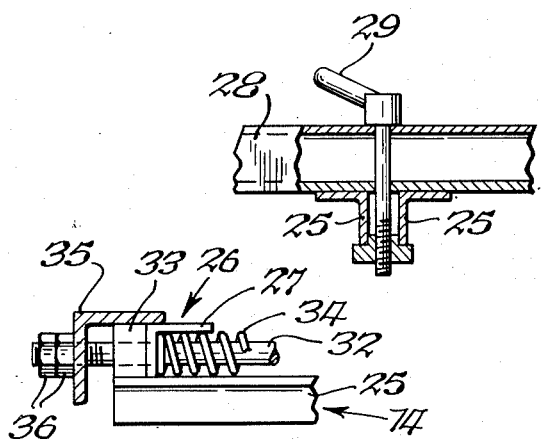
Fig. 6.
Fig. 7.
INVENTOR.
Clifford E. Lehmann,
BY Parker, Prochnow Stemen,
Attorneys.

Patented Dec. 2, 1952

2,619,999

UNITED STATES PATENT OFFICE 2,619,999

CARRIER MOUNTED WORK CLAMPING AND RELEASING MECHANISM

Clifford E. Lehmann, High Point, N. C.

Application September 27, 1949, Serial No. 118,165

7 Claims. (Cl. 144—289)

1

This invention relates to improvements in clamping mechanisms of the type commonly used in connection with the gluing or otherwise securing together of boards or other pieces of material.

Clamp carriers heretofore have been used which include a plurality of clamping devices or frames which are movable one at a time into a position convenient to the workman and upon which the workman places the boards or other parts with glue or other adhesive applied thereto, and then manually actuates a plurality of screws which apply clamping pressure to the boards or other material. The clamp carrier is then again advanced to place a different clamping device into operative relation to the worker, and to support the first mentioned clamping device to permit the glue to set. These clamping devices are generally mounted on a rotary carrier or an endless chain carrier on which the clamped work is held while the glue or other adhesive sets, whereupon they are returned to the aforesaid position convenient to the operator who must then actuate the clamping devices to release the glued work and then again tighten the screw clamps when new workpieces with adhesive applied thereto are positioned on the clamping device or frame. The tightening and loosening of the clamping screws is a fatiguing and time-consuming operation, and the judgment of the worker is depended upon to apply the necessary pressure to the work which is being operated upon.

One of the objects of this invention is to provide work-clamping devices in which the application of the clamping pressure to the work and the releasing of the same is done by means of power mechanisms which relieve the worker of the labor of manually applying and releasing clamping pressure on the work.

Another object of this invention is to provide a construction by means of which power-operated means are provided which may operate on any desired number of clamping members or frames.

It is also an object of this invention to provide a clamping member which is so constructed that uniform and predetermined pressure will be applied to all workpieces acted on by the clamping device.

A further object is to provide a clamp carrier of more efficient construction in which the manual labor heretofore required for applying pressure to the work is eliminated so that each workman is capable of greater production with less physical effort.

It is also an object of this invention to provide clamping devices or frames of improved construction which may readily be placed into operative relation to the power actuating means therefor.

Other objects and advantages will be apparent from the following description of one embodiment of the invention and the novel features will be particularly pointed out hereinafter in connection with the appended claims.

In the accompanying drawings:

Fig. 4 is a fragmentary, sectional elevation thereof, on line 4—4, Fig. 1.

Fig. 5 is a fragmentary, sectional elevation approximately on line 5—5, Fig. 2, showing a clamping device moving into operative relation to a power-actuated member.

Fig. 6 is a fragmentary, sectional view, approximately on the line 6—6, Fig. 2.

Fig. 7 is a fragmentary, sectional elevation, on line 7—7, Fig. 3.

My invention is intended primarily for use in connection with a plurality of clamping devices or frames in which the work to be glued is clamped and held clamped until the glue or adhesive has set. Such clamping devices or frames may be manually moved one at a time into a position convenient to the workman, or they may be mounted on a carrier of any desired construction, such as a rotary carrier, a chain carrier, or the like.

Figure 1:
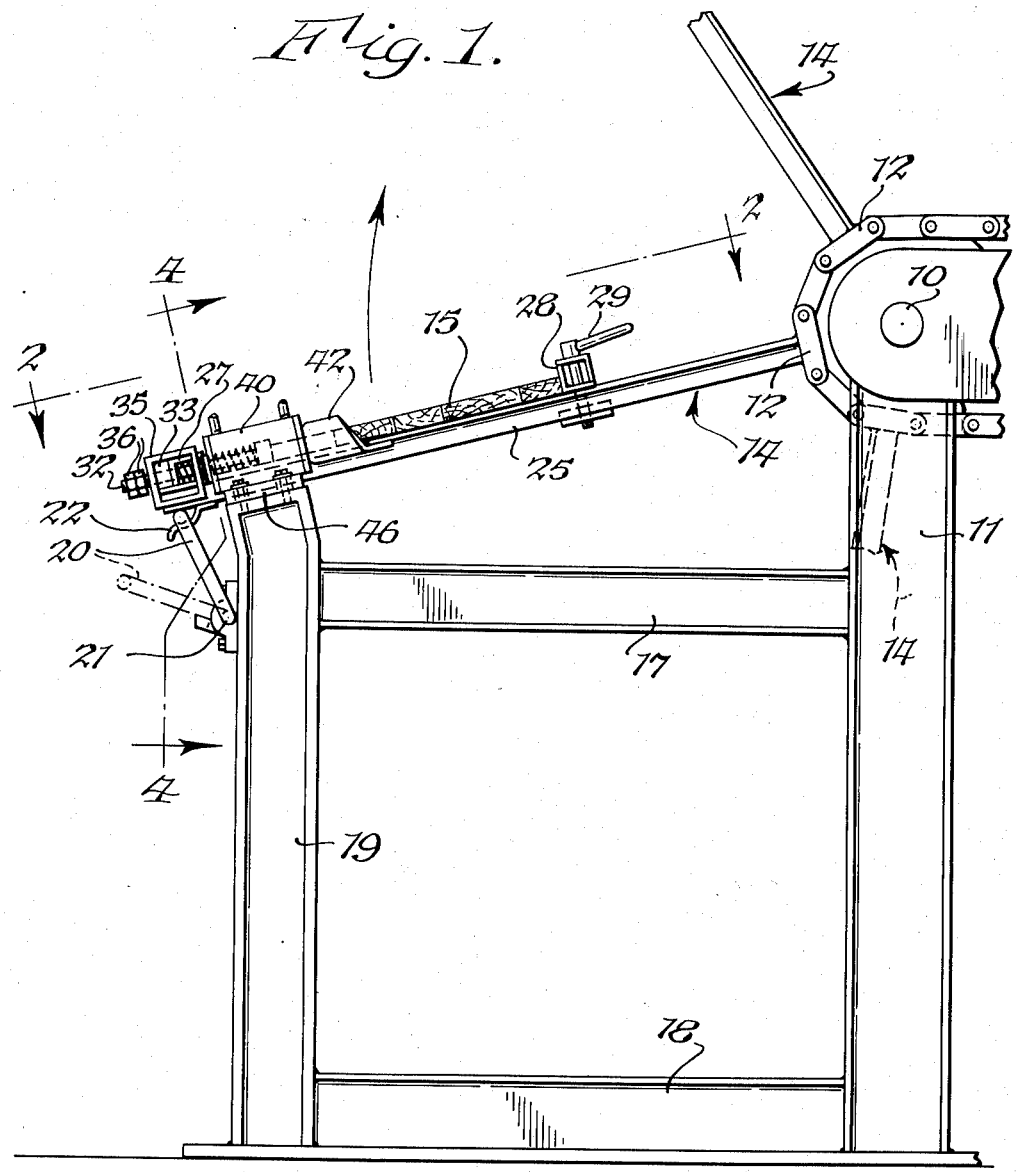
Fig. 1 is a fragmentary side elevation of a clamp carrier showing one of the clamping devices in operative position to have the finished work removed therefrom and new work applied thereto.

In Fig. 1, I have illustrated by way of example an end portion of an endless chain type of carrier for the clamping devices or frames. These chains which carry the clamping devices mesh with suitable sprockets mounted on a shaft 10 suitably journalled on a frame 11 of the machine. Alternate links 12 of the chain shown have clamping devices generally designated 14 mounted thereon. The chain is intermittently advanced to present one of the clamping devices in a position convenient to the operator to remove glued work from the clamping device and position work to be glued thereon. The chain may be driven by any suitable mechanism (not shown).

Any suitable means may be provided for holding a clamping device in position to be operated upon by the operator, and in the construction shown by way of example, I have illustrated the frame 11 of the clamp carrier as provided with extensions of any suitable type or construction, each comprising, for example, a pair of horizontally extending members 17 and 18 suitably secured to the frame 11, and an upright frame member 19 secured to the members 17 and 18. These frame members are arranged at the opposite sides of the apparatus in such position that the clamping devices or frames 14 may pass between these frame extensions during the movement of the chain. A movable supporting member is, however, provided which is mounted on the upright frame extensions 19, and in the particular construction shown by way of example, this movable supporting member 20 is in the form of an inverted U-shaped rod having the lower ends thereof pivoted at 21 on the upright frame members 19. As shown in Fig. 1, the movable supporting member 20 is shown in full lines with the horizontal portion thereof in position to permit the outer end of a clamping device or frame 14 to rest thereon, and if desired, a retaining spring or clip 22 may be employed to yieldingly hold the member 20 in supporting position. When it is desired to release the clamping device for movement with the chain of the carrier, the movable supporting member 20 is moved into the broken line position shown in Fig. 1, whereupon the clamping device 14 is free to move between the frame extensions 17 to 19. 24 represents brackets or stops on which the movable member 20 may rest when in its inoperative position. Any other means for temporarily supporting the clamping devices in convenient position to the operator may be employed, if desired.

Each clamping device or frame includes a plurality of work-supporting rods or bars 25, which are suitably connected with or mounted on the endless chain or other type of carrier, and in the construction illustrated, the work supporting bars 25 are in the form of angle bars each having one of its legs arranged to support the work 15. The several work supporting bars of a clamping device are, in the construction illustrated, rigidly secured at their outer ends to a suitable cross member or bar 26, which, in the construction illustrated by way of example, comprises an angle bar 27. Each of the clamping devices may also include one or more back stops 28 of any suitable or usual construction, and which may be held by means of clamps 29 in fixed positions with relation to the work-supporting bars. These back stops are, of course, adjustable so as to adapt the clamping devices to operate on panels or workpieces of various sizes.

The clamping of the work on the clamping devices or frames in my improved construction is effected by means of a plurality of spring-pressed plungers 32 which extend through apertures in the cross bar 26 and a guide bar 33 which may be arranged adjacent to the cross bar 26. These plungers are movable lengthwise in the apertures in the cross bar 26 and guide bar 33 and are urged toward the work by means of coil springs 34, each plunger having an enlarged end formed to bear against the work. One end of each spring 34 bears against the enlarged end of the plunger, and the other end bears against the cross bar 26. The pressure which is exerted by the springs on the work may be regulated by moving the back stops 28 toward or from the cross bar 26.

In order to release the pressure on the work so that finished work can be removed from the clamping devices and work to be glued positioned thereon, I have provided the following construction.

At the outer end of each of the clamping devices or frames, I provide a beam 35 extending parallel to the cross bar 26 and which in the particular construction illustrated by way of example is of channel shape. The beam is provided with apertures through which the plungers 32 extend and the outer ends of the plungers extending beyond the beam 35 are provided with enlargements or shoulders, such as heads or nuts 36. In the construction shown for this purpose, the outer ends of the plungers are threaded and a pair of nuts is provided on the threaded outer end of each plunger, one of the nuts serving as a lock nut. The beam 35 is movable in a direction transverse of its length. When the beam is moved to the right in Fig. 2, it moves out of engagement with the heads or nuts 36 of the plungers, so that the springs are free to urge the plungers against the work. The beam 35 is movable to the left from the position shown in Fig. 2 into that shown in Fig. 3, in which the plungers are moved to the left, thus compressing the springs and moving the plungers out of engagement with the work 15. Any other means engaging the plungers for simultaneously moving the same out of engagement with the work may be employed.

In accordance with this invention, power actuated means are employed for moving the beams 35 into positions to compress the springs and release the work. Any suitable or desired power actuated means may be employed for this purpose, and the power-operated means is so constructed and positioned that it lies out of the path of movement of the clamping devices as they move into and out of position convenient to the operator. The power devices, however, are so positioned that when a clamping device moves into position to be operated upon, the power actuated means will be in position to apply pressure to the springs.

In the particular mechanism illustrated in the drawings, I provide a pair of power operated members, one arranged at each side of the path of movement of the clamping devices. These power actuated members may be of any suitable or desired type and by way of illustration, I have shown cylinders 40 provided with plungers or pistons 41 which may be actuated by a suitable fluid under pressure. I have also provided on each clamping device brackets or abutments 42 which extend outwardly beyond the opposite sides of the clamping devices. These brackets may each be secured to one or more of the work-supporting bars 25. The ends of the beam 35 extend laterally beyond the opposite sides of the clamping device or frame, and the brackets are so located as to form spaces between the ends of the beams and the brackets 42 in which the power actuated members will be positioned when a clamping device is in position convenient to the operator and resting on the supporting member 20. In the construction shown, the head ends of the cylinders 40 will react against the abutments or brackets 42 and the plungers 41 may move outwardly against the ends of the beam 35. The ends of the beams may be provided with butt blocks 44 secured to the beams and against which the plungers 41 may act.

The power devices may be suitably mounted on the upper ends of the upright frame members 19 in any suitable manner, and in the construction shown, the upper ends of the frame members 19 are inclined so that the upper closed ends 45 thereof will be inclined at approximately the same angle as the clamping devices when the same rest upon the supporting members 20. Each cylinder 40 is suitably secured to a base 46 which extends to one side of the cylinder and the outer side portion of each base is movably mounted on the adjacent upright frame member 19 in any suitable manner so that the cylinders and their plungers will readily adjust themselves relatively to the brackets 42 and the ends of the beams 35. In the construction shown for this purpose, the base 46 is provided with slots 48 extending in a direction lengthwise of the axes of the cylinders and bolts or screws 49 pass through the slots 48 and are secured in threaded holes in the upper ends 45 of the upright frame members. The bolts 49 do not clamp the bases to the frame members 19, but merely guide the bases so that they may slide relatively to the frame members 19 in the direction of the lengths of the cylinders. Consequently, when fluid under pressure is supplied to the cylinders 40, the cylinders may move relatively to the frame members 19 while reacting against the brackets 42 and the ends of the beam 35, so that the frame members 19 will not be subjected to any strains or forces by the cylinders, and also the forces exerted by the cylinders will be confined to the clamping devices themselves and will place no strains on the clamp carrier. By means of the adjustable mounting of the cylinders relatively to the frame members 19, the cylinders correctly position themselves in the space between the brackets 42 and the ends of the beam 35, as clearly shown in Fig. 5. Consequently, if the brackets 42 on some clamping devices are differently located than on other clamping devices, or if the chain of the carrier is slightly slack, the brackets 42 may slide the cylinders relatively to the frame members 19, as indicated in Fig. 5. If a cylinder is spaced from a bracket 42, as is the case with the bracket shown in broken lines in Fig. 5, then when fluid pressure is admitted to the head end of the cylinder, the piston or plunger, engaging the beam, will move the cylinder into position to engage the bracket 42. Any other suitable or desired means for permitting limited lengthwise movement of the cylinders or other power operated devices may be provided.

Suitable means controlled by the operator are provided for actuating the power device. In the particular construction illustrated a pair of ducts 51 and 52 are provided for carrying fluid under pressure to the opposite ends of the cylinder 40, and these tubes or ducts are suitably connected with a reservoir or container of fluid under pressure (not shown). The valve by means of which fluid under pressure may be admitted to or discharged from either of the ducts 51, 52 may also be of any suitable or well known construction, and it is, therefore, not herein illustrated.

In the operation of the mechanism described, the rotary or chain carrier for the clamping device is first actuated to advance a clamping device into a position convenient to the operator, or a clamping device may be manually placed in this position, and this clamping device is then temporarily held in such position, for example, by means of the movable supporting member 20.

Figures 2, 3:
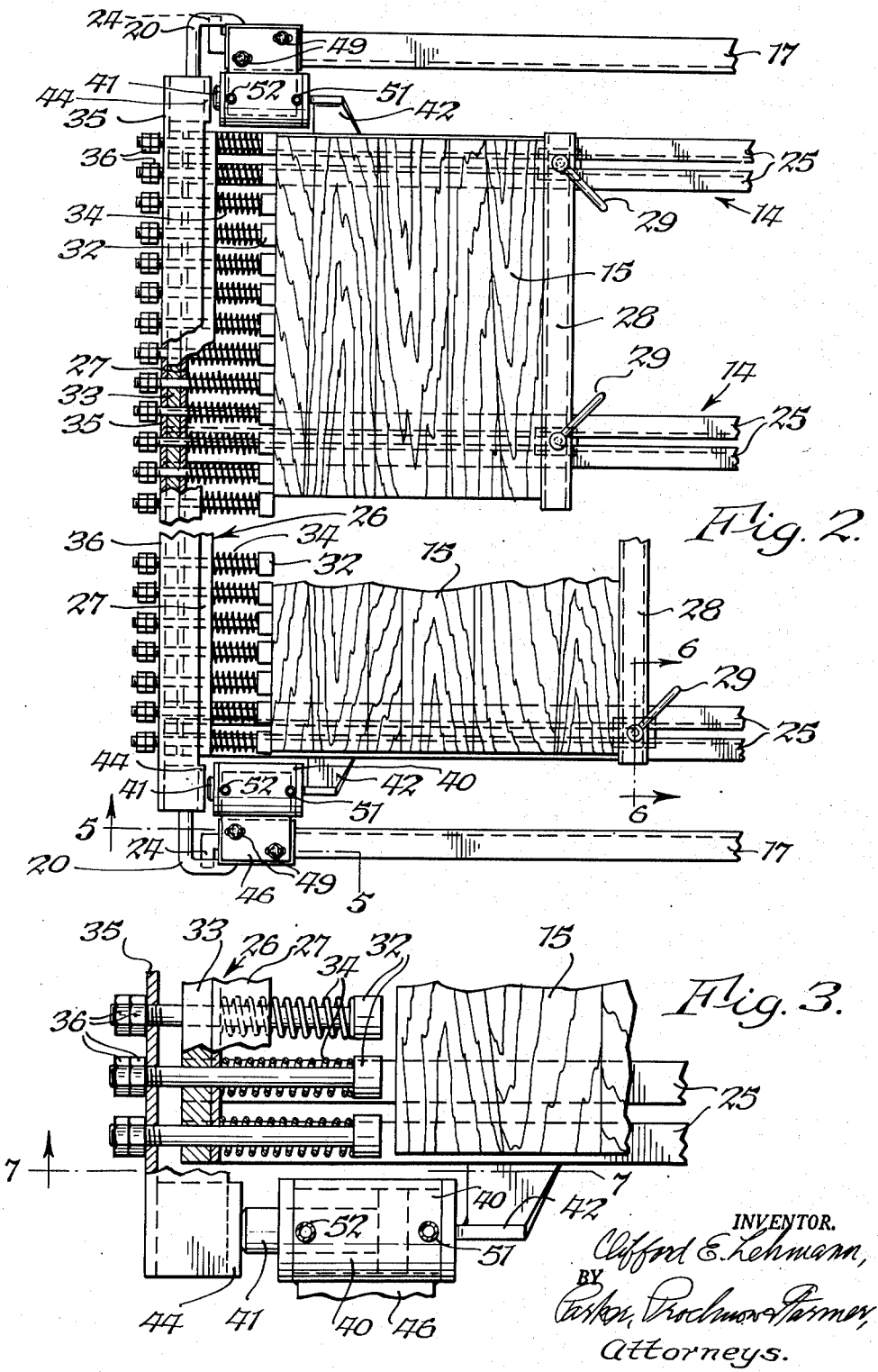
Fig. 2 is a fragmentary, top plan view thereof approximately as seen from line 2—2, Fig. 1.
Fig. 3 is a fragmentary top plan view, on an enlarged scale, showing a power member in position in which no pressure is applied by the clamping device to the work.

During this positioning of the clamping devices, the brackets or abutments 42 and the ends of the beam 35 will be positioned at opposite ends of the cylinders 40, it being understood that the cylinders may be moved by engagement with the brackets 42 so as to permit the brackets to move into correct relation to the cylinders. Fluid under pressure is then admitted to the duct 51, whereupon the plunger 41 will move outwardly against the ends of the beam 35 and move the beam outwardly with reference to the clamping device, for example, into a position such as shown in Fig. 3, in which position, the various plungers 32 will be moved against the action of the springs 34. If a workpiece or panel 15 on which the glue has set is in the clamping device, the operator then removes this panel and inserts into the clamping device boards or workpieces having glue or other adhesive applied thereto until the required number of workpieces have been placed on the clamping device. The operator then actuates the valve to discharge fluid under pressure from the duct 51 and to admit such fluid to the other end of the cylinder through the duct 52, whereupon the plunger or piston 41 will be returned to its inner position with the cylinder. The work will then be clamped in the clamping device or frame by means of the plungers 32 actuated by the springs 34. The clamping device is then ready for removal from its position on the supporting member 20 and this member is swung from the full line position shown in Fig. 1 to the broken line position, whereupon the clamping device may be advanced and another clamping device brought into position to be operated upon.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. Work clamping and releasing mechanism including a carrier having a plurality of clamping devices mounted thereon and each comprising supports for the work to be clamped, a back stop secured to said supports and against which the work to be clamped is pressed, a cross bar secured to said work supports in spaced relation to said back stop, yielding means mounted on said cross bar and extending from said cross bar toward said back stop for exerting pressure against the work to clamp the same on said clamping device against said back stop, a beam movably mounted on said clamping device and connected with said yielding means to move the same out of engagement with the work, an abutment on said clamping device arranged in spaced relation to said beam, and relatively stationary power actuated means with relation to which said clamping devices may be positioned one at a time by said carrier so that said power actuated means will be located between said abutment and said beam, said power actuated means reacting on said abutment and said beam to move said beam into a position to move said yielding means out of engagement with the work.

2. Work clamping and releasing mechanism including a movable carrier having a plurality of clamping devices mounted thereon, each of said clamping devices comprising a plurality of substantially parallel work supporting members, a back stop extending crosswise of said members and secured thereto, a cross bar secured to said members in spaced relation to said back stop, a plurality of plungers slidably mounted on said cross bar and having ends formed to engage the work, springs urging said ends of said plungers in a direction toward said back stop to clamp the work between said plungers and said back stop, a beam engaging said plungers and movable into a position to move said plungers against the actions of said springs away from the work and into another position to release said plungers, abutments on said supporting members, and relatively stationary power actuated members positioned to be interposed between said abutments and said beam when said clamping devices are placed by said carrier in position to be operated upon, said power actuated members including movable parts which may be actuated in one direction for moving said beam in a direction to compress said springs to release the work, and in another direction to release said springs to press said plungers against the work, said power actuated members being positioned out of the path of movement of said beam and said abutments when said clamping members are moved by said carrier.

3. A work clamping and releasing mechanism including a carrier, a plurality of clamping devices mounted on said carrier and which are moved by said carrier one at a time into a position to be operated upon, each of said clamping devices including means for supporting the work, a back stop secured to said means, a cross bar secured also to said work supporting means in spaced relation to said back stop, a plurality of springs supported on said cross bar and each having one end bearing against said cross bar and the other end extending toward said back stop for exerting pressure against the work to press the same toward said back stop, a beam mounted on said clamping device and connected with said other ends of each of said springs, an abutment on each of said clamping devices, and a power actuated device mounted in substantially fixed relation to said clamp carrier, said abutment and said beam moving into operative relation to said power actuated device when a clamping device is moved by said carrier into said position to be operated upon, said power actuated device, when energized, moving said beam in a direction to withdraw said other ends of said springs out of engagement with the work, and when released, releasing said springs for clamping the work.

4. Work clamping and releasing mechanism including a plurality of movable clamping devices, each comprising a plurality of substantially parallel work supporting members, a back stop extending crosswise of said members and secured thereto, a cross bar secured to said members in spaced relation to said back stop, a plurality of plungers slidably mounted on said cross bar and extending from said cross bar toward said back stop and having ends formed to engage the work, springs urging said ends of said plungers toward said back stop to clamp the work between said plungers and said back stop, a beam engaging said plungers and movable into a position to move said plungers against the actions of said springs in a direction away from the back stop and into another position to release said plungers, the ends of said beam extending beyond the sides of said clamping devices, abutments on said clamping devices extending beyond the sides of the same in spaced relation to the ends of said beams, and relatively stationary power actuated members positioned to enter between said abutments and said beam ends when said clamping devices are placed into position to be operated upon, said power actuated members including movable parts which may be actuated in one direction for moving said beam in a direction to move said plungers to compress said springs to release the work and in another direction to release said plungers to permit the springs to press the same against the work, said power actuated members, when said parts thereof are in position to release said springs, permitting said clamping devices to pass said power actuated members.

5. A work clamping and releasing mechanism according to claim 4 including stationary frame members supporting said power actuated members, and a slidable mounting for said power actuated members which permits sliding of the same relatively to said supports in a direction lengthwise of a clamping device when the same is in said position to be operated upon.

6. A work clamping and releasing mechanism including a carrier, a plurality of clamping devices mounted on said carrier and which are moved by said carrier one at a time into a position to be operated upon, each of said clamping devices including means for supporting the work, a back stop secured to said means, a cross bar secured also to said work supporting means in spaced relation to said back stop, a plurality of plungers slidably mounted on said cross bar and movable toward and from the back stop, springs urging said plungers toward said back stop to press the work against said back stop, a beam mounted on said clamping device and having apertures through which said plungers extend, said plungers having enlarged ends beyond said beam to enable said beam when moving outwardly with reference to said clamping device to move said plungers against the actions of said springs out of engagement with the work, said beam having the ends thereof extending beyond the sides of said clamping device, a movable supporting member movable into and out of position to support a clamping device in said position to be operated upon, said clamping mechanisms having frame members at opposite sides thereof and between which said clamping devices may pass when moved by said mechanism, abutments secured to said clamping devices and extending laterally beyond the sides of said clamping device in spaced relation to the ends of said beam, cylinders containing pistons mounted on said side frame members, bases on which said cylinders are mounted and which extend from said side frame members toward said clamping devices and on which said cylinders are supported to extend beyond said abutments and said beam ends when a clamping device is held in position to be operated upon by said movable support, means for slidably mounting said bases on said side frame members to slide in the direction of the axes of said pistons, and means for supplying motive fluid under pressure to opposite sides of said cylinders, said cylinders and pistons when fluid under pressure is supplied thereto to move said pistons out of said cylinders reacting on said abutments and beam ends to move said beam ends in a direction to move said plungers out of engagement with the work against the action of said springs, said pistons when withdrawn into said cylinders releasing said springs to enable the same to urge said plungers against the work and permitting said abutments and beam ends to move out of engagement with said pistons and cylinders when said clamping device is moved out of its position to be operated upon.

7. A movable work clamping device comprising a plurality of substantially parallel work supporting members, a backstop extending crosswise of said members and secured thereto, a cross bar secured to said members in spaced relation to said backstop, a plurality of plungers slidably mounted on said cross bar and extending from said cross bar toward said back stop and having ends formed to engage the work at intervals, springs urging the ends of said plungers toward said backstop to clamp the work between said plungers and said backstop, a beam engaging said plungers and movable into a position to move said plungers against the action of said springs in a direction away from the backstop, and into another position to release said plungers, and power operated means acting on said beam and on said clamping device to move said beam to compress said springs to release work in said clamping device.

CLIFFORD E. LEHMANN.

REFERENCES CITED

The following references are of record in the file of this patent:

UNITED STATES PATENTS

| Number | Name | Date |
|---|---|---|
| 1,578,898 | Littleford | Mar. 30, 1926 |
| 1,799,135 | Roberts | Mar. 31, 1931 |
| 1,873,818 | Burns | Aug. 23, 1932 |
| 1,896,113 | Steuernagel | Feb. 7, 1933 |
| 1,981,499 | Francis | Nov. 20, 1934 |